United States Patent Office 3,542,744
Patented Nov. 24, 1970

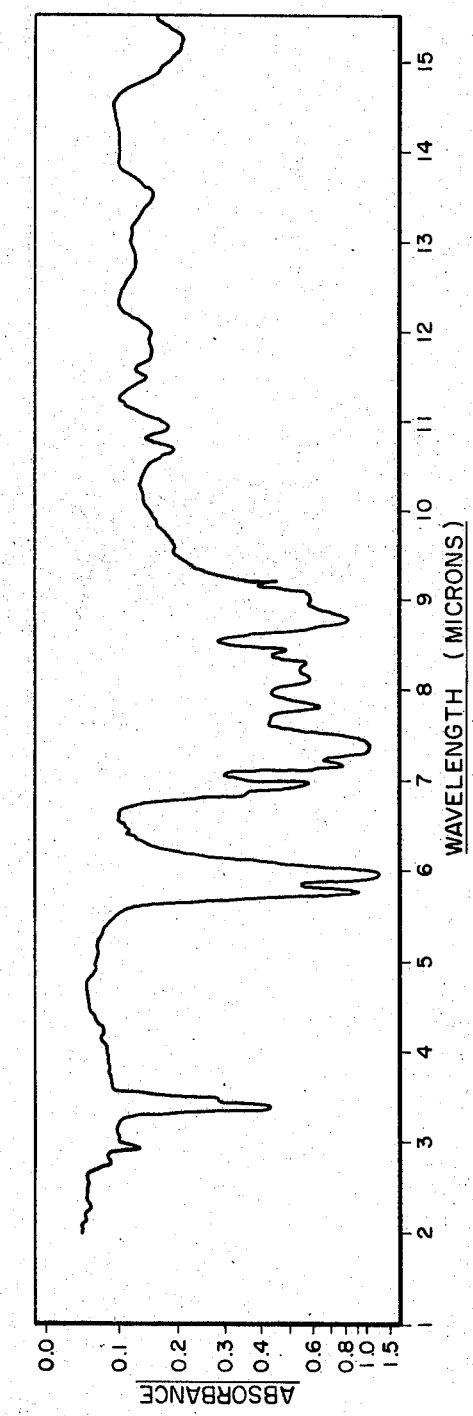
INVENTORS
HERBERT K. REIMSCHUESSEL
JOHN V. PASCALE

3,542,744
NOVEL FILM FORMING POLYIMIDES COMPRISING POLY[BETA(N-PROPYL)COLUTARIMIDE]
Herbert K. Reimschuessel, Morristown, and John V. Pascale, Parsippany, N.J., assignors to Allied Chemical Corporation, New York, N.Y., a corporation of New York
Original application Sept. 13, 1965, Ser. No. 486,636, now Patent No. 3,422,093, dated Jan. 14, 1969. Divided and this application Aug. 2, 1968, Ser. No. 767,874
Int. Cl. C08g 20/12
U.S. Cl. 260—78                                                        9 Claims

ABSTRACT OF THE DISCLOSURE

This invention relates to novel polyimides comprising recurring units containing a glutarimide ring. The polyimides of this invention possess high thermal stability and good resistance to hydrolytic degradation and can be formed into tough films and fibers.

---

This is a division of application Ser. No. 486,636.

Although epsilon-caprolactam is readily polymerized to form polymers generally known as nylon 6, derivatives of epsilon-caprolactam, wherein one of the hydrogen atoms attached to a carbon atom of the heterocyclic seven-membered ring is replaced by an organic radical, are generally extremely difficult, if not impossible, to polymerize. As an exception to this rule, there is disclosed in copending application Ser. No. 341,068 filed Jan. 29, 1964 a class of readily polymerizable epsilon-caprolactam derivatives having alpha-substituents containing at least one meta-directing electrophilic group. An example of such a monomer is alpha-(carboxymethyl) caprolactam which forms a highly crosslinked polymer which is amorphous, infusible, and insoluble in most solvents.

We have now discovered that high molecular weight linear polymers can be prepared from beta-(carboxymethyl) caprolactam. These polymers are highly crystalline as obtained or are readily convertible to the crystalline state.

In accordance with the present invention, beta-(carboxymethyl) caprolactam is polymerized at a temperature ranging from the melting point of the monomer (191°–193° C.) up to about 350° C. with the reaction preferably being conducted in an inert atmosphere such as nitrogen. When polymerized, the monomer rearranges to form a material composed of recurring units containing a glutarimide ring structure as illustrated in the following equation:

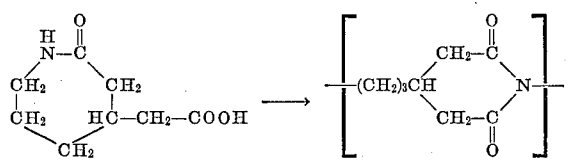

When the polymerization is carried out at a temperature below the melting point of the resulting polymer, which is about 275° C., the polymer produced is a highly crystalline solid material. This material may, of course, be converted to the amorphous state when processed at a temperature above its melting point. When the polymer-illustrated in Example 4 wherein the viscosities of polypoint of the resulting polymer, there is obtained an amorphous polymer which can readily be converted to the crystalline state by annealing in a dry inert atmosphere or in steam at a temperature of 100° C. or above.

The molecular weight of the polymer can be controlled by the addition of so-called viscosity regulators to the monomer prior to polymerization. This effect is illustrated in Example 4 wherein the viscosities of polymerization is carried out at a temperature above the melting mer samples are progressively lowered by the addition of increasing quantities of the n-butyl ammonium salt of beta-(carboxymethyl) caprolactam. The addition of amines, or anhydrides of carboxylic acids, have a similar effect upon the molecular weight. It has also been found that admixing water with the monomer prior to polymerization also tends to lower the viscosity of the polymer obtained.

Employing the polymerization procedure of this invention, conversions of monomer to polymer of over 95% have been obtained. The polymer has a crystalline melting point of about 275° C. and a density of about 1.3 grams/cm.³. The polymer is further characterized by high thermal stability and a good stability against hydrolytic degradation. The thermal decomposition temperature of the polymer was found to be about 50 C. higher than those of both nylon and polyethylene terephthalate when tested under identical conditions. For instance, when heated in a differential thermal analysis apparatus at a rate of heating of 20 C./min., the polymer of this invention decomposed at 458° C. while nylon 6 decomposed at 410° C. and polyethylene terephthalate at 409° C. Stability against hydrolytic degradation was tested by heating polymeric samples in saturated steam at 170° C. (115 lbs./sq. in.); 190° C. (182 lbs./sq. in.); and 205° C. (250 lbs./sq. in.) for 15 minutes. Nylon 6 dissolved at 170° C. and nylon 66 at 190° C. while the polymer of this invention withstood the above conditions at 205° C. The polymer produced from beta-(carboxymethyl) caprolactam can be formed into tough films and fibers which can be drawn. This drawing, accomplished at a temperature of at least 100° C., is accomplished by some crystallization, and it is generally preferred to effect further crystallization of the product by annealing. The polymer is soluble in meta-cresol, sulfuric acid, and formic acid, and can be cast into films from solutions in these solvents. In the accompanying figure, there is shown a typical infrared spectrum of the polymer of this invention with optical density plotted against wave length in microns.

The beta-(carboxymethyl) caprolactam used as a monomer in the present invention is itself a novel compound and it is prepared by a process involving a number of novel intermediates. The process which we have employed starts with a known compound alpha, beta-unsaturated caprolactam and then proceeds through a series of novel steps. In the first step, the alpha, beta-unsaturated caprolactam is reacted with a sodium dialkyl malonate (reaction product of metallic sodium with a dialkyl malonate) to form a beta-(dicarbalkoxymethyl) caprolactam in accordance with the following equation:

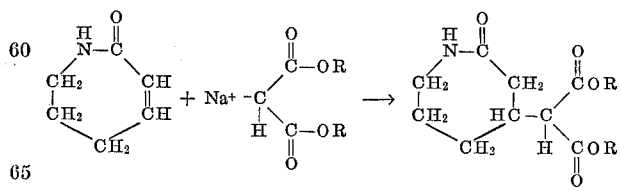

wherein R is a lower alkyl group preferably containing one to five carbon atoms. This process can be readily carried out by adding the alpha, beta-unsaturated caprolactam to an alcoholic solution of sodium dialkyl malonate and refluxing the resulting reaction mixture.

The beta-(dicarbalkoxymethyl)caprolactam is next converted to the corresponding diacid. One method of accomplishing this is to form an alkali metal salt by reacting the beta-(dicarbalkoxymethyl)caprolactam with at least two equivalents of an alkali metal hydroxide such as sodium or potassium hydroxide and then acidifying the resulting salt to form the corresponding diacid. This procedure is illustrated in the following equation wherein the acid is hydrochloric acid:

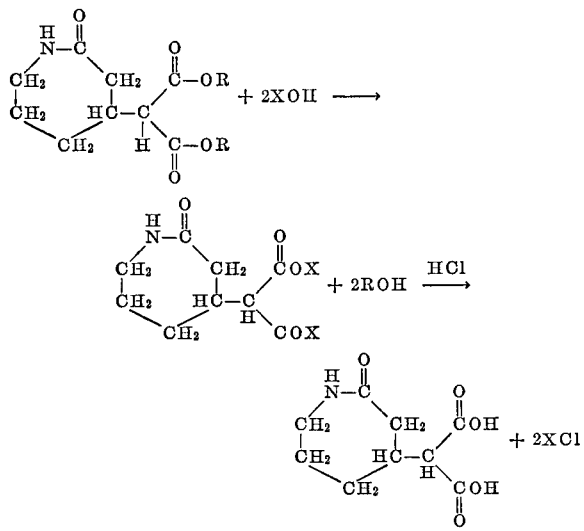

wherein R has the meaning given above and X is an alkali metal. The monomer beta-(carboxymethyl)caprolactam is prepared by dicarboxylation of beta-(dicarbalkoxymethyl)caprolactam at elevated temperatures. This is preferably carried out by heating the beta-(dicarbalkoxymethyl)caprolactam at a temperature of about 140°–190° C. in a solvent medium such as o-dichlorobenzene until the evolution of carbon dioxide ceases. The beta-(carboxymethyl)caprolactam is then recovered and polymerized by heating it at a temperature of 191° to 350° C. as previously described.

As an alternative procedure, the polymer can be produced from the beta-(dicarbalkoxymethyl)caprolactam without isolating the beta-(carboxymethyl)caprolactam monomer. For instance, the beta-(dicarbalkoxymethyl)caprolactam can be subjected to a heat treatment, including temperatures of over 191° C., thus, not only driving off the carbon dioxide but also forming a polymer. However, although such a procedure is more direct, it is less difficult to obtain a pure, high molecular weight polymer when the beta-(carboxymethyl)caprolactam is separated from the reaction mixture prior to the preparation of the polymer.

It is also to be noted that poly[beta(n-propyl)glutarimide] can be produced from derivatives of beta-(carboxymethyl)caprolactams which are readily hydrolizable back to beta-(carboxymethyl)caprolactam. For instance, polymer can be produced from esters of beta-(carboxymethyl)caprolactam such as the lower alkyl esters. These compounds can be prepared by the esterification of beta-(carboxymethyl)caprolactam with the appropriate alcohol. Beta-(carbalkoxymethyl)caprolactam esters can also be made from the previously disclosed beta-(dicarbalkoxymethyl)caprolactam by reacting this latter compound with only one equivalent of alkali metal hydroxide to thereby convert only one carboxy group per molecule to a salt radical, acidifying the resulting compound to form a monoacid, and then heating the monoacid to drive off carbon dioxide. These reactions are illustrated by the following equation:

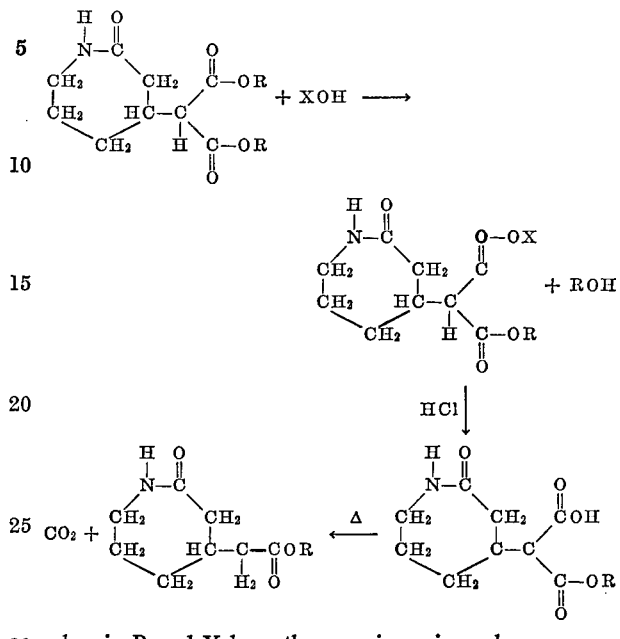

wherein R and X have the meanings given above.

In addition to being useful in the preparation of poly[beta(n-propyl)glutarimide], the monomers of this invention can be polymerized with other monomers. For instance, a particularly outstanding copolymer can be prepared by copolymerizing the present monomers with epsilon-caprolactam.

The following examples are given to further illustrate the invention, but it is to be understood that the invention is not to be limited in any way by the details described therein. In the examples, reduced viscosities were measured in meta-cresol at concentrations of 0.5 gram of polymer per 100 milliliters of solution, the units accordingly being deciliters per gram.

EXAMPLE 1

384 grams of alpha-bromocaprolactam and 400 ml. of 2,6-lutidine were heated to reflux with stirring for 3 hours. Upon cooling, the solution was filtered and 376 grams of 2,6-lutidine hydrobromide were collected. The filtrate obtained contained alpha, beta-unsaturated caprolactam and was dried with anhydrous sodium sulfate. The solution was reduced under vacuum to 800 ml. and then added to an alcoholic solution of sodium diethyl malonate. The latter solution had been prepared by adding 50.6 grams of sodium to 3 liters of anhydrous ethanol, followed by the addition of 640 grams of diethyl malonate to the refluxing solution, and continued heating at reflux for 3 hours. The resulting reaction mixture was then heated to reflux for an additional 5 hours, filtered, and distilled to remove both the benzene and ethanol. The remaining solution was diluted with ethyl ether. The ether solution was then washed with 10% hydrochloric acid, saturated sodium bicarbonate solution, and finally with water. After removal of both the ether and the excess diethyl malonate under vacuum, the remaining viscous oil was extracted with petroleum ether and the resulting solid material recrystallized from hexane. There were obtained 352 grams of beta-(dicarbethoxymethyl)caprolactam that melted at 49°–50° C.

*Analysis.*—Calculated for $C_{13}H_{21}O_5N$ (percent): C, 57.55%; H, 7.80; N, 5.16. Found (percent): C, 57.18 H, 7.59; N, 5.42.

EXAMPLE 2

A solution of 352 grams of beta-(dicarbethoxymethyl)caprolactam in 500 ml. of absolute ethanol was added with stirring to a solution of 175 grams of potassium hydroxide in one liter of anhydrous ethanol. The resulting mixture was heated to reflux for 6 hours. After cooling to room temperature, the formed dipotassium salt was collected by filtration, washed with ethanol, and dried. 370 grams of this salt were obtained. This material was then dissolved in 250 ml. of wate and the solution was cooled to minus 5° plus 0° C. The cooled solution was then acidified with 241 ml. of concentrated hydrochloric acid. The resulting precipitate was collected and recrystallized from methanol. 280 grams of material composed of beta-(dicarboxymethyl) caprolactam and some potassium chloride were obtained 40-grams portions of this material were added to one liter of o-dichlorobenzene which had been heated to 160°–170° C. After the evolution of carbon dioxide had ceased, the resulting solutions were filtered. Upon cooling, 174 grams of beta-(carboxymethyl)caprolactam were obtained. Recrystallization from water yielded a white crystalline product that melted at 191°–193° C.

*Analysis.*—Calculated for $C_8H_{13}O_3N$ (percent): C, 56.13; H, 7.65; N, 8.18%. Found (percent): C, 56.12 H, 7.36; N, 8.91.

EXAMPLE 3

Ten grams of beta-(carboxymethyl)caprolactam and 2 ml. of water were placed into a polymerization tube maintaining a nitrogen atmosphere. The tube was then immersed into a Wood's metal bath which had been heated to 240° C. After 1½ hours, the contents of the tube had been solidified. At this point, it was removed from the polymerization tube, ground, and analyzed. The polymer was identified as poly[beta(n-propyl)glutarimide]. Extraction with hot water indicated that 95% of the material had polymerized. The polymer was found to be soluble in meta-cresol, formic acid, and sulfuric acid; it was insoluble in the common organic solvents. The reduced viscosity as measured in meta-cresol was 0.54. The polymer melted at 275° C., decomposed at 450° C., and had a density of 1.3 gm./cm.$^3$. The infrared absorption spectrum of the polymer is shown in the figure.

Ten grams of beta-(carboxymethyl)caprolactam and one milliliter of water were then heated at 240° C. for 3 hours as described above. The resulting polymer had a reduced vicosity of 0.78 and a melting point of 275° C.

Ten grams of beta-(carboxymethyl)caprolactam were next heated at 290° C. for 20 hours as described above without the addition of water. The resulting polymer had a reduced viscosity of 5.3 and a melting point of 275° C.

EXAMPLE 4

Ten-gram samples of beta-(carboxymethyl)caprolactam were polymerized at 290° C. in a nitrogen atmosphere for 24 hours with some of the polymerization being conducted in the presence of various quantities of the n-butyl ammonium salt of beta-(carboxymethyl)caprolactam. The conversion to polymer exceeded 98.5% in each case. The viscosities of the obtained poly[beta(n-propyl)-glutarimide] polymers are listed in Table I.

Table I

Mole ratio beta-(carboxymethyl)caprolactam: Salt—
Reduced viscosity in meta-cresol
- 50:1 _____ 0.73
- 100:1 _____ 1.11
- 200:1 _____ 1.69
- 500:1 _____ 2.91
- No salt _____ 4.49

The polymers were amorphous, but they could be readily crystallized by annealing at a temperature of at least 100° C.

EXAMPLE 5

Ten grams of beta-(dicarboxymethyl)caprolactam were heated under nitrogen to 200° C. for one hour. The temperature was then raised to 290° C. and held there for 4 hours. The resulting polymer had a reduced viscosity in meta-cresol of 0.7. The polymer had a melting point of 270°–280° C. and was identified as poly[beta(n-propyl) glutarimide]

EXAMPLE 6

Into a polymerization tube that was heated to 200° C. were placed under nitrogen 4 parts of beta-(carboxymethyl)caprolactam and 2.64 parts of epsilon-caprolactam. The temperature was then raised to 260° C. and held there for 20 hours. A clear polymer was obtained having a viscosity of 0.5 in meta-cresol.

EXAMPLE 7

In a mixture containing 120 ml. of ethanol, 20 ml. of benzene and 2 ml. of concentrated sulfuric acid, 34.24 grams of beta-(carboxymethyl)caprolactam were dissolved. This solution was refluxed for 4 hours. The excess solvent was then removed by distillation and the residue dissolved in ether. The ether solution was washed with saturated sodium bicarbonate solution and dried over anhydrous sodium sulfate. The ether was removed in vacuum and the residue recrystallized from n-hexane. There were obtained 27.3 grams of beta-(carbethoxymethyl)caprolactam having a melting point of 78° C.

*Analysis.*—Calculated for $C_1OH_{17}O_3N$ (percent): C, 60.28; H, 8.60; N, 7.03. Found (percent): C, 59.94; H, 8.62; N, 6.94.

Ten grams of the beta-(carbethoxymethyl)caprolactam were placed into a polymerization tube while maintaining a nitrogen atmosphere. The tube was heated at 290° C. for 20 hours, thereby producing poly[beta(n-propyl) glutarimide] having a reduced viscosity of 0.59.

EXAMPLE 8

To a solution containing 27.13 grams of beta-(dicarbethoxymethyl)caprolactam in 75 ml. of anhydrous ethanol solution is added 5.6 grams of potassium hydroxide dissolved in 60 ml. of anhydrous ethanol. The resulting solution is held at room temperature until the pH of this solution is 7. At this point, the solution is heated under reflux for one hour, filtered, and the ethanol distilled under vacuum. To the residue is added ethyl ether. The salt which forms is removed by filtration, washed with ether, and dried under vacuum. The salt is dissolved in 150 ml. of chloroform and the solution cooled below 0° C. An equivalent amount of hydrochloric acid is added and the chloroform distilled under reduced pressure. The residue is beta-(carboxy-carbethoxymethyl)caprolactam. This material is decarboxylated by heating at 160° C. to yield beta-(carbethoxymethyl)caprolactam, melting point 78°–79.5° C. Heating beta-(carbethoxymethyl)caprolactam at 290° C. in a nitrogen atmosphere gives poly[beta-(n-propyl)glutarimide].

EXAMPLE 9

Molded films were prepared from poly[beta(n-propyl) glutarimide] having reduced viscosities of 3.0 and 1.6, and the tensile properties of these films were determined in accordance with ASTM Test D882. The results are shown in the following table:

TABLE II

| | $\eta_{red}=3.0$ | $\eta_{red}=1.6$ |
|---|---|---|
| Ultimate elongation, percent | 56 | 15 |
| Ultimate tensile strength, p.s.i. | 34,500 | 10,200 |
| Yield strength, p.s.i. | 25,790 | 10,200 |
| Yield elongation, percent | 22 | 8.3 |
| 2% secant modulus, p.s.i. | 236,700 | 198,400 |

It will be apparent that many modifications and variations may be effected without departing from the scope of the novel concepts of the present invention and the illustrative details disclosed are not to be construed as imposing undue limitations on the invention.

We claim:
1. A film-forming polymer consisting essentially of recurring units of the formula

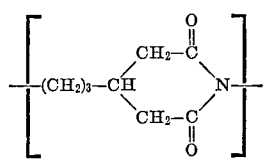

2. A process for the preparation of a film-forming polymer consisting essentially of recurring units of the formula

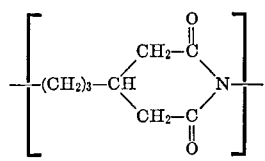

said process comprising reacting alpha, beta-unsaturated caprolactam with a sodium dialkyl malonate of the formula

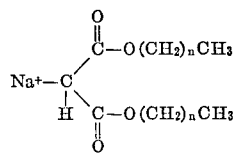

wherein $n$ is an integer of 0 to 4, to form beta-(dicarbalkoxymethyl)caprolactam of the formula

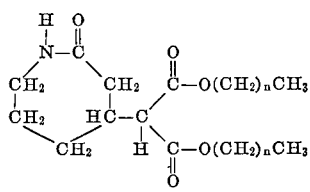

wherein $n$ has the meaning given above, converting said beta-(dicarbalkoxymethyl)caprolactam to beta-(dicarboxymethyl)caprolactam and heat treating said beta-(dicarboxymethyl)caprolactam at a temperature of 140° C. to 350° C. to form the above-defined polymer, at least a portion of said heat treatment being at a temperature of over 191° C.

3. A process as claimed in claim 2, wherein said heat treatment is accomplished in two steps: the first step being the heating of said beta-(dicarboxymethyl)caprolactam in a solvent medium at a temperature of about 190° C. whereby carbon dioxide is evolved and beta-(carboxymethyl)caprolactam is formed; and the second step being the heating of said beta-(carboxymethyl)caprolactam at a temperature of 191° to 350° C.

4. A process as claimed in claim 2 wherein the beta-(dicarbalkoxymethyl)caprolactam is converted to beta-(dicarboxymethyl)caprolactam by reacting said beta-(dicarbalkoxymethyl)caprolactam with at least two equivalents of an alkali metal hydroxide to form an alkali metal salt and then reacting the alkali metal salt with an acid.

5. A film-forming process for the preparation of a polymer consisting essentially of recurring units of the formula

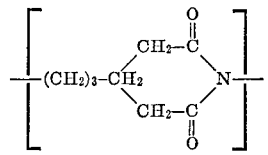

said process comprising heating a compound of the formula

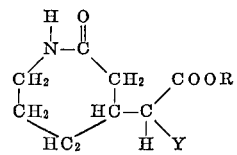

wherein R is a member selected from the group consisting of hydrogen and lower alkyl and Y is a member selected from the group consisting of hydrogen and carboxy, at a temperature of 140° to 350° C. with at least a portion of the heat treatment being at a temperature of at least 191° C.

6. A film-forming process for the preparation of a polymer consisting essentially of recurring units of the formula

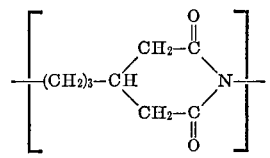

said process comprising heating a monomer of the formula

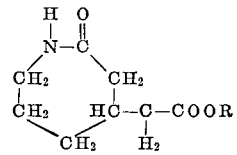

wherein R is a member selected from the group consisting of hydrogen and lower alkyl at a temperature of about 191° to 350° C.

7. A process as claimed in claim 6, wherein said monomer is beta-(carboxymethyl)caprolactam.

8. A process consisting essentially of heating a mixture of epsilon-caprolactam and beta-(carboxymethyl)caprolactam in an inert atmosphere at a temperature of 191° to 350° C. until a film-forming copolymer of said compounds is formed.

9. The copolymer obtained by the process of claim 8.

References Cited
UNITED STATES PATENTS

| | | | |
|---|---|---|---|
| 3,093,618 | 6/1963 | Graf et al. | 260—726 |
| 3,384,625 | 7/1964 | Reimschuessel | 260—78 |
| 3,422,093 | 1/1969 | Reimschuessel et al. | 260—239.3 |
| 3,435,007 | 3/1969 | Starkovsky et al. | 260—78 |

WILLIAM SHORT, Primary Examiner

E. WOODBERRY, Assistant Examiner

U.S. Cl. X.R.

260—239.3

UNITED STATES PATENT OFFICE
CERTIFICATE OF CORRECTION

Patent No. 3,542,744  Dated November 24, 1970

Inventor(s) Herbert K. Reimschuessel and John V. Pascale

It is certified that error appears in the above-identified patent and that said Letters Patent are hereby corrected as shown below:

Column 1, line 3, "POLY[BETA(N-PROPYL)COLUTARIMIDE]" should be -- POLY[BETA(N-PROPYL)GLUTARIMIDE] --.

Column 1, delete line 68 and substitute therefor -- ization is carried out at a temperature above the melting .

Column 2, line 4, "polymer-" should be -- poly- --.

Column 2, delete line 5.

Column 2, lines 37 and 38 "accomplished" should be -- accompanied --.

Column 5, line 7, "wate" should be -- water --.

Claim 5, column 8, line 1, after "A" delete "film-forming" and after "of a" insert -- film-forming --.

Claim 6, column 8, line 26, after "A" delete "film-forming" and after "of a" insert -- film-forming --.

SIGNED AND
SEALED
MAR 2 1971

(SEAL)
Attest:

Edward M. Fletcher, Jr.
Attesting Officer

WILLIAM E. SCHUYLER, J
Commissioner of Patent